(12) United States Patent
Phillips et al.

(10) Patent No.: US 6,617,421 B2
(45) Date of Patent: Sep. 9, 2003

(54) METHOD FOR PRODUCING SUBSTANTIALLY DRY WATER-INSOLUBLE POLYMERS FOR IMPROVED FLOCCULATION IN THE BAYER PROCESS

(75) Inventors: Everett C. Phillips, Batavia, IL (US); Ronald J. Allain, Naperville, IL (US)

(73) Assignee: Ondeo Nalco Company, Naperville, IL (US)

( * ) Notice: Subject to any disclaimer, the term of this patent is extended or adjusted under 35 U.S.C. 154(b) by 0 days.

(21) Appl. No.: 10/059,474

(22) Filed: Jan. 29, 2002

(65) Prior Publication Data

US 2003/0135013 A1 Jul. 17, 2003

Related U.S. Application Data

(62) Division of application No. 09/542,074, filed on Apr. 3, 2000, now Pat. No. 6,372,882.

(51) Int. Cl.[7] .............................. C08F 6/14; B01D 21/01
(52) U.S. Cl. ................. 528/502; 524/5; 524/8; 524/71; 524/272; 524/276; 210/733; 210/732
(58) Field of Search ................... 210/733, 732; 528/502; 524/5, 8, 71, 272, 276

(56) References Cited

U.S. PATENT DOCUMENTS

| 3,085,853 | A | 4/1963 | Lesinski et al. |
|---|---|---|---|
| 3,397,953 | A | 8/1968 | Galvin et al. |
| 3,541,009 | A | 11/1970 | Arendt et al. |
| 3,681,012 | A | 8/1972 | Sibert |
| 3,755,531 | A | 8/1973 | Tsukawaki et al. |
| 4,767,540 | A | 8/1988 | Spitzer et al. |
| 5,008,089 | A | 4/1991 | Moody et al. |
| 5,286,391 | A | 2/1994 | Malito et al. |
| 5,346,628 | A | 9/1994 | Sommese et al. |
| 5,534,235 | A | 7/1996 | Reed et al. |
| 5,696,228 | A | 12/1997 | Coville |
| 6,036,869 | A | 3/2000 | Selvarajan et al. |
| 6,372,882 | B1 * | 4/2002 | Phillips et al. |

FOREIGN PATENT DOCUMENTS

JP      54--4986      1/1979

* cited by examiner

*Primary Examiner*—Duc Truong
(74) *Attorney, Agent, or Firm*—Michael B. Martin; Kelly L. Cummings; Thomas M. Breininger

(57) ABSTRACT

The present invention is a method of producing substantially dry water insoluble polymers from poly alkyl esters of vinylic monomers for use in a method for the clarification of red mud-containing liquors generated in the Bayer process for the recovery of alumina from bauxite ore. The polymers can be either homopolymers, copolymers or terpolymers. Preferably, the dried emulsion polymers are high molecular weight polymers of poly(methyl acrylate), poly(methyl acrylate/acrylic acid), poly(vinyl acetate/acrylic acid/methyl acrylate), poly(t-butyl methacrylate/acrylic acid/methyl acrylate) and poly(t-butyl acrylate/acrylic acid/methyl acrylate).

23 Claims, No Drawings

US 6,617,421 B2

METHOD FOR PRODUCING SUBSTANTIALLY DRY WATER-INSOLUBLE POLYMERS FOR IMPROVED FLOCCULATION IN THE BAYER PROCESS

This application is a Division of Ser. No. 09/542,074 filed Apr. 3, 2000 Now U.S. Pat. No. 6,372,882.

FIELD OF THE INVENTION

The present invention is directed to a process for producing substantially dry water insoluble polymers from poly alkyl esters of vinylic monomers for improved flocculation of red mud in the Bayer process and for a process of clarification of the red mud-containing liquors generated in the Bayer process for the recovery of alumina from bauxite ore with high molecular weight emulsion polymers.

BACKGROUND OF THE INVENTION

The Bayer process for the production of alumina includes the basic steps of pulverizing a bauxite ore which is slurried in water and digested with caustic at elevated temperatures and pressures. The caustic solution dissolves oxides of aluminum to form an aqueous sodium aluminate solution that must be separated from the caustic-insolubles of bauxite ore (red mud). Separation typically occurs through the process of sedimentation and filtration, which are often aided by a flocculant. Once separated, alumina trihydrate can be precipitated out of the aqueous sodium aluminate solution and collected as product.

Specifically, the pulverized bauxite ore is fed into a slurry mixer where the slurry makeup water is typically spent liquor and added caustic. The bauxite ore slurry is then diluted and passed through a digester under high pressure and temperature conditions where about 98% of the total available alumina is released from the ore as caustic-soluble sodium aluminate. After digestion, the slurry passes through several flash tanks where the pressure of the digested slurry is reduced from several atmospheres to one atmosphere and the temperature of the slurry is reduced from about 200° C. to about 105° C.

The aluminate liquor leaving the flashing operation contains about 1 to 20 weight percent solids. The coarser solids may be removed from the aluminate liquor with "sand trap" cyclones. The finer solids are generally separated from the liquor first by settling aided by a flocculant and then filtration. The aluminate liquor slurry leaving the flash tank is diluted by a stream of recycled washer overflow liquor. Any Bayer process slurry taken from the digesters through a subsequent dilution of the slurry, including the flash tanks, but before the primary settler, is the primary settler feed.

Normally, the primary settler feed is fed to the primary settler where it is treated with a flocculant. As the mud settles, the clarified sodium aluminate solution ("green" or "pregnant" liquor) overflows to a weir and is collected. This overflow from the primary settling tank is then passed through subsequent process steps.

The clarity of the primary settler overflow is crucial to efficient processing of alumina trihydrate because further steps will be required if the overflow has not been properly clarified. An overflow liquor containing a concentration of suspended solids of about 10–500 mg suspended solids per liter is typically unacceptable and will require further processing in a secondary clarification stage to achieve the desired 10 mg suspended solids per liter.

A flocculant is often added to aid in the partial separation of the red mud solids from the pregnant liquor in the primary settler stage. Flocculating agents, such as inverse emulsion liquid polymers, dry polymers and polysaccharides including starch, improve the separation of insolubles. Flocculants are able to increase the rate at which solids settle by reducing the amount of residual solids suspended in the liquor and by decreasing the amount of liquor in the settled solids phase.

Flocculants are highly important in the primary settling stages. Red muds are comprised of iron oxides (about 50 weight percent), together with silicon oxides, calcium oxides, sodium alumino-silicates, titanium oxides and other material commonly comprise about 5 to about 50 weight percent of the bauxite ore. Generally, the muds are comprised of very fine particles, which hinder separation of red mud particles from the solubilized alumina liquor. If the rate of separation is too slow, output is diminished and the overall process efficiency is impaired. If the separation is not clean, a more extensive treatment to remove residual solids will be required.

Conventional treatments include the application of polysaccharides, such as starch and dextran. For instance, U.S. Pat. No. 3,085,853 to Lesinski et al. uses native dextrans to increase the rate of sedimentation of finely divided solids in aqueous suspensions. After polysaccharides were introduced, synthetic polymeric flocculants were developed which have became more popular for use in the Bayer process. Additional polymers include those formed from the polymerization of vinyl amine or vinyl formamide as disclosed in U.S. Pat. No. 5,346,628; phosphonic acid polymers as disclosed in U.S. Pat. No. 5,534,235; and polymers containing hydroxamic acid groups in U.S. Pat. No. 4,767,540.

Other Bayer process treatments include the combination of polysaccharides with synthetic polymeric flocculants. For example, U.S. Pat. No. 3,397,953 to Galvin et al. discloses that polyacrylic acid alone is not suitable as a flocculating agent, instead it teaches the use of a blend of starch and polyacrylic acid on red mud suspensions. The polyacrylic acids generally have molecular weights of less than 300,000. The flocculation and sedimentation activity of the blend is used in the primary settler stage of a bauxite process, and contains at least about 80 weight percent of the acrylic acid mer with a molecular weight in excess of 50,000 and preferably in excess of 100,000. Other starch/polymer combinations are disclosed in U.S. Pat. Nos. 3,397,953; 3,541,009; 3,681,012; and 5,008,089.

Emulsions of polymers formed of lower primary alkyl acrylate monomers for refining alumina are disclosed in U.S. Pat. No. 3,755,531. Moreover, unexamined Japanese Patent No. 4986-1979 discloses a process for producing an ultra high molecular weight acrylic acid copolymer salt. However, only lower molecular weight polymers which are less effective flocculants than higher weight polymers are disclosed in the Japanese Patent.

Disclosed in U.S. Pat. No. 5,286,391 is a process for improving the flocculation of suspended red mud solids in a Bayer process liquor comprising a water-continuous dispersion containing a polymer dispersed in the water of the continuous phase, wherein the polymer comprises at least 50 mole percent of mer units having pendant groups that hydrolyze to pendant carboxylic acid groups. However, this reference suggests that because the in-situ hydrolysis occurs over time and results in continuous activation, that the optimal polymer would be one containing 100 mole percent of mer units having pendant hydrolyzable groups. By contrast, this invention discloses that there is an optimal degree of hydrolysis (not 100%), that occurs in the range of 70–80%.

Oil continuous liquid flocculants (hereafter termed o/c flocculants) and powder flocculants are typically referred to as synthetic flocculants. Such flocculating agents are added to the primary settler, the mud washing circuit, mud-dewatering systems including centrifuges and vacuum filters and to enhance mud stacking in mud disposal sites.

High molecular weight synthetic polymers are often used in conjunction with starches. Starch is said to improve supernatant liquor clarity, the interface between the settled mud and the cleaner supernatant liquor, and reportedly helps to maintain the stability of the settled mud in settlers and washers. However, starch occasionally produces a red mud which has poor rheology and undesirable underflow characteristics. If not diluted, the underflow can occasionally become difficult to pump.

The oil continuous flocculants must be inverted prior to application to transfer the flocculant to the water phase of the emulsion. If o/c flocculants are added neat (non-inverted) the polymer flocculant will not disperse in the Bayer liquor, the oil phase containing the flocculant will plug the injection equipment, and poor activity will be encountered.

Oil continuous liquid flocculants of sodium or ammonium acrylate are largely used in the bauxite industry for settling the red mud. Since the oil continuous liquid flocculants contain about 25–30% of paraffinic oils as the carrier, one drawback to these flocculants is the liquor from which the alumina separates out becomes enriched with increasing amounts of organic material. Since organics in the liquor inhibit the precipitation of alumina, a flocculant containing the least amount of organic material is the most desirable. The liquid flocculants are generally easier to transfer, store and apply to the process than dry powders. However, shipping costs for the liquids tend to be considerably higher since the emulsions contain only about 25–40% polymer solids. Furthermore, some o/c liquids can become unstable if exposed to temperatures below their freezing point.

Dry polymers are an effective alternative to liquid polymers in the flocculation of Bayer process liquors. As opposed to emulsion polymers, dry polymers contribute little to the organic load of the Bayer liquor and are less expensive to ship. While such advantages have made the use of dry polymers more common, they remain under used because of the special handling required to ensure the polymers remain dry before use. Dry polymers are extremely hygroscopic and must be handled, stored and prepared without exposing the polymer to moisture or humid air. Once a dry polymer has been exposed to moisture or humidity, severe system plugging and loss of activity will result. The hydration of a dry polymer prior to its use results in product loss, disposal problems, and increased maintenance costs. Dry polymer storage, solution make-up and feeding equipment must be very elaborate to prevent hydration.

Additionally, dry polymers are difficult to dissolve in water, with 90%+polymer hydration requiring mixing and aging time as high as 2 hours. This slow dissolution rate requires large inventories of solutions divided into 2 separate tanks. The first tank is the high mixing energy tank where dissolution occurs. The second tank is the working solution tank from which the polymer solution is drawn and fed into the process.

Accordingly, it would be advantageous to provide a substantially dry flocculating agent which would expedite the separation of the red mud solids from the pregnant liquor, improve the clarity of liquor overflow, be easy to handle and feed into the process without the hygroscopic characteristics of current dry polymers.

SUMMARY OF THE INVENTION

The present invention is directed to a method for producing substantially dry water insoluble polymers from poly alkyl esters of vinylic monomers for use in a method for the clarification of red mud-containing liquors generated in the Bayer process for the recovery of alumina from bauxite ore. The polymers can be either homopolymers, copolymers or terpolymers. Preferably, the dried emulsion polymers are high molecular weight polymers of poly(methyl acrylate), poly(methyl acrylate/acrylic acid), poly(vinyl acetate/acrylic acid/methyl acrylate), poly(t-butyl methacrylate/acrylic acid/methyl acrylate) and poly(t-butyl acrylate/acrylic acid/methyl acrylate).

One aspect of this invention is a process for producing substantially dry water insoluble high molecular weight polymers from poly alkyl esters of vinylic monomers comprising:

spray-drying into a gas stream an aqueous dispersion of a high molecular weight water-continuous emulsion polymer including an emulsifier, a surfactant, water and having an intrinsic viscosity in 2N $NaNO_3$ at 30° C. of at least 15 dL/g; and collecting the resultant polymer particles.

A second aspect of the present invention includes a process for producing substantially dry water insoluble high molecular weight polymers from poly alkyl esters of vinylic monomers comprising:

drying an aqueous dispersion of a high molecular weight water-continuous emulsion polymer including an emulsifier, a surfactant, water and having an intrinsic viscosity in 2N $NaNO_3$ at 30° C. of at least 15 dL/g;

forming a film comprised of the dried aqueous dispersion substantially free of water; and grinding the film to form a powder of substantially dry polymer particles.

An additional aspect of this invention is a method of treating Bayer process red mud containing liquor comprising the steps of:

adding to the red mud containing liquor a substantially dry water insoluble high molecular weight polymer formed from a polymer emulsion of poly alkyl esters of vinylic monomers having an intrinsic viscosity in 2N $NaNO_3$ at 30° C. of at least 18 dL/g;

forming a red mud phase and a clarified liquor phase; and recovering the clarified liquor phase.

Another aspect of this invention is a method for treating Bayer process red mud containing liquor comprising the steps of:

adding to the red mud containing liquor an effective amount of a substantially dry water insoluble high molecular weight polymer formed from a homopolymer emulsion wherein the homopolymer has an intrinsic viscosity in 2N $NaNO_3$ at 30C of at least 15 dL/g;

forming a red mud phase and a clarified liquor phase; and recovering the clarified liquor phase.

A further aspect of this invention is a method for treating Bayer process red mud containing liquor comprising the steps of:

adding to the red-mud containing liquor an effective clarifying amount of a substantially dry water insoluble high molecular weight polymer formed from a terpolymer emulsion wherein the terpolymer has an intrinsic viscosity in 2N $NaNO_3$ at 30° C. of at least 15 dL/g;

forming a red mud phase and a clarified liquor phase; and recovering the clarified liquor phase.

DESCRIPTION OF THE INVENTION

The present invention is directed to a process for forming substantially dry water insoluble polymers from poly alkyl esters of vinylic monomers. The polymers are in the form of either homopolymers, copolymers or terpolymers. Preferably, the dried emulsion polymers are high molecular weight polymers of poly(methyl acrylate), poly(methyl acrylate/acrylic acid), poly(vinyl acetate/acrylic acid/methyl acrylate), poly(t-butyl methacrylate/acrylic acid/methyl acrylate) and poly(t-butyl acrylate/acrylic acid/methyl acrylate).

The substantially dry polymers are not soluble in water but are soluble in a caustic solution such as that found in the Bayer process. Typically, once hydrolyzed in the Bayer process liquors the dried polymer has an intrinsic viscosity in 2N $NaNO_3$ at 30° C. of at least 15 dL/g. Dried polymers formed from primarily acrylic acid esters and acrylic acid are not effective flocculating agents in the Bayer process as themselves. It is only after the polymers are hydrolyzed that they become effective as flocculants. The high alkalinity and high temperatures of the Bayer process hydrolyze the esters over time to form polymer acrylic acid or active sodium polyacrylate.

The hydrophobic nature of the dried polymers greatly increases their ease of storage; a moisture free environment is not necessary. System plugging and loss of product due to hydration are all but eliminated. The polymers are hydrolyzed primarily under high temperatures in a caustic environment. Additionally, the polymers can be added directly to the process. Pre-hydrolyzation of the substantially dry polymers is not required but can be advantageous before using the polymers as a flocculant for the clarification of red mud containing liquors. Given sufficient residence time within the Bayer process system, hydrolyzation of the polymers will typically occur under the high temperature and caustic environment of the Bayer process. When such a residence time is not available the polymers can be added, at least in a portion, after pre-hydrolyzation. Thus, the dry polymers may be added directly into the liquors as flocculants without the need for further processing. Additionally, the polymers do not substantially add to the organic load of the system. Additionally, the substantially dry polymers may be added hydrolyzed, in whole or in part. The polymers can be pre-hydrolyzed using any compatible caustic solution for hydrolysis, but are typically hydrolyzed as a make-up solution using either the spent liquor, washer overflow liquor, the return liquor from the mud lakes of the Bayer process or a combination thereof. The polymers are usually pre-hydrolyzed when the residence time of the dried polymer would be insufficient for the optimum amount of hydrolysis to occur, such as when the polymer is added to the washer stream. Furthermore, a combination of dried polymer and pre-hydrolyzed polymer may be used. A portion of dry polymer may be added to the flash tanks or some other up-stream point from the primary thickener and then a portion of pre-hydrolyzed polymer is added just before or into the center well of the thickener or clarification vessel.

The starting material for the substantially dry polymers is an aqueous emulsion polymer dispersion, which may be dried by any means known in the art. The aqueous emulsion polymers are more fully described in U.S. Pat. No. 6,036,869, U.S. application Ser. No. 09/074,706 and U.S. application Ser. No. 09/203,314, wherein the disclosures of which are hereby incorporated by reference.

In one embodiment, the aqueous dispersion of a high molecular weight water-continuous emulsion polymer is dried using gas suspension drying such as spray, flash and fluid-bed drying as well as hybrid systems. More preferably the emulsion is dried using a spray drier typically consisting of spraying the emulsion into a gas stream through means such as rotary atomizers, pressure nozzles, pneumatic nozzles and sonic nozzles. Spray drying normally begins with the atomization of the liquid feed into fine droplets which are then contacted with a heated gas stream in which the droplets are suspended. The heated gas evaporates the liquid, leaving a substantially dry powder similar in size to the droplets from which it was formed. The dried powder is then separated from the gas and collected. The powder can be collected by cyclones, fabric filters or directly from the bottom of the chamber drying cone.

Important parameters in the spray drying process include; the gas outlet temperature, gas inlet temperature, and residence time. All three factors are interrelated.

Residence time is calculated to be the volume of the dryer divided by the volumetric gas flow. Typically, the residency time lasts no longer than 1 minute, and is unlikely to ever exceed 2 minutes. Preferably, the residency time is the longest practicable time for the dryer size used. It was observed that longer residency times produced a dryer final product, which is preferred within reason. Thus, a residency time of about 45 seconds or above is preferred but an adequate dry polymer can be obtained with a residency time as low as 10 seconds. Of course optimal residency times are affected by such parameters as the size and type of spray dryer used and the efficiency at which it is operated and parameters such as inlet and outlet gas temperatures.

Gas outlet temperatures are preferably between 40° C. and 90° C., and more preferably between 60° C. and 70° C. Any temperature is acceptable so long as adequate drying occurs. The outlet temperature is the resultant mix of the inlet temperature and the temperature of the polymer injected into the gas stream, thus it is considerably lower in temperature than the gas inlet air. Generally, the gas outlet temperature will be the lowest possible temperature capable of giving a desired end product to reduce costs.

The gas inlet temperature is primarily regulated by what is practical and economical. Additionally, the melting point of the polymer being fed may be considered when determining an inlet temperature, since a resulting outlet temperature which exceeds the melting point of the polymer may cause an unacceptable gel to form, resulting in a glass-like finished product instead of the desired powdered product.

Moisture levels of the collected dried polymer particles are typically less than 5% by weight, and preferably less than 3% by weight. Of course the ultimate objective is to obtain a dried polymer with the lowest level of moisture possible. Dried polymers having a moisture level greater than 5% can be produced, but as moisture levels increase the chance for creating a gelled product increases.

In an alternative embodiment, the aqueous dispersion of high molecular weight water-continuous emulsion polymer is dried to form a film comprised of the dried aqueous dispersion substantially free of water, which is then ground to produce a powder of substantially dry polymer particles. The emulsion polymer can be dried by any means capable of developing a film of dried polymer that can be ground.

Preferably, the emulsion can be dried by heating the emulsion in a suitable container or by spin-drying the emulsion. When heating the emulsion, temperatures can be as low as ambient temperatures and as high as up to 90° C. Once dried, the emulsion forms a film that can be ground into a powder comprised of dried polymer particles. The film is ground to provide increased surface area to aid in the hydrolyzation of the polymers under the high temperature caustic environment of the Bayer process. Preferably, the film is ground into particles having a diameter of less than 4mm, but any size convenient for the administration of the dried polymer can be used. The ground dried polymer can be added directly to the Bayer process slurry as a flocculant or after it is pre-hydrolyzed in a caustic solution.

The dry polymers produced by the processes described above are added to Bayer process liquors containing dissolved sodium aluminate and red mud to aid in the recovery of alumina. The liquors to be treated include; the primary settler slurry which contains high levels of both red mud and dissolved sodium aluminate, red mud washing slurries and the secondary clarification liquors. Additional liquors to be treated include; red mud slurries which are dewatered in centrifuges or on vacuum drum or disc filters, as well as red mud slurries which are flocculated to improve their mud stacking properties or to improve the tendency to release water from the mud slurry.

The flocculation of the red mud by the dried polymers is most challenging in the primary clarification stage because of the high concentration of fine particles and high total alkalinity. The polymers are able to reduce the solids found in the secondary clarification stages by reducing the level of suspended solids that remain in the supernatant above the floc formed in the primary settler liquor.

The Bayer process digests bauxite ore under highly alkaline conditions which can hydrolyze the dry polymers. Typically, the primary settler liquors contain sodium or calcium hydroxide, sodium aluminate, and sodium carbonate. The total alkalinity of the primary settler is typically from about 100 to about 300 grams per liter of settler feed, as sodium carbonate. The solid content varies from about 25 to about 85 grams per liter of settler feed.

The present dry polymers can be used for clarification and settling of red mud-containing liquors in the Bayer process. Polymer additions can be made to the red mud dewatered in either centrifuges or by vacuum filtration (drum filters, and disc filters among others). Additionally, the polymers can be added to the red mud which is flocculated after the last mud washing stage to improve the mud stacking properties in the mud disposal area.

Upon flocculation and settling of the primary settler feed by the dry polymers, a liquor/mud interface forms with a supernatant liquor low in suspended solids (generally ranging from about 10 to about 500 mg/l) overlying a mud layer. The lower mud layer of flocculated material is comprised of both red mud solids (generally ranging from about 10% to 70% mud solids by weight) and pregnant liquor. The overlying supernatant is a semi-clear liquor that is separated for secondary clarification. This supernatant is "mud-clear" and the interface between it and the mud layer is clearly seen in some cases, but the supernatant is not entirely free of suspended solids, appearing instead as a hazy, but transparent liquid. The dry polymers diminish the amount of suspended solids in the supernatant to decrease the extent of secondary clarification required to obtain the resulting sodium aluminate solution. Dry polymer addition may also reduce or eliminate the need for added starch by providing improved supernatant liquor clarity and improved red mud stability.

High alkalinity and elevated temperatures aid in hydrolyzing the substantially dry polymers. The intrinsic viscosity of the resulting hydrolyzed polymers are measured in 2N $NaNO_3$ at 30° C. and were from about 20 to 40 dL/g. The total alkalinity of the red mud containing liquor is from about 10 to 300 grams per liter expressed as sodium carbonate. The solids content of the red mud containing liquor is from about 10 grams per liter to 350 grams per liter. The treatment of the red mud containing liquor is typically conducted at atmospheric pressure between about 5° C. to 200° C. Preferably, the treatment of the red mud containing liquor can be conducted at atmospheric pressure and at temperatures between about 30° C. to 115° C. The treatment of the primary settler feed is typically conducted at atmospheric pressures and at elevated temperatures from about 80° C. or 90° C. to about 103° C. or 115° C.

The substantially dry polymers are preferably added upstream from the primary settler in one of the flash tanks or between the flash tanks and the primary settler feed well to provide sufficient temperature and residence times for the hydrolysis of the polymer. It should be noted that hydrolysis is not instantaneous. Hydrolysis typically progresses as the polymer and mud make their way through the flash tanks and down the various piping into the primary settler. Additionally, the substantially dry polymers can be added into the primary settler feed or directly into the digesters.

Surprisingly, it has been discovered that through the formation of micro-floccules of the polymer and the suspended solids, a red mud is produced which is more amendable to the bulk flocculation in the primary settler. The micro-floccules form as the polymers hydrolyze and become active toward the red mud, thus the polymers are preferably added upstream of the primary settler.

The pre-hydrolyzed dry polymers may also be utilized to clarify the suspended solids in any of the clarification vessels, e.g. settlers and washers. Preferably, the polymers can treat any stage of the washer underflow at the mud disposal site to improve mud stacking. Moreover, the polymers can be used in mud filters, including but not limited to drum and vacuum filters.

The substantially dry polymers may also be used in the following areas of the Bayer process including classification, flocculation, precipitation and dewatering of alumina trihydrate. Preferably, the polymers can be used to flocculate and settle the alumina trihydrate Bayer process product after the pregnant liquor is cooled. Furthermore, the substantially dry polymers can be used the Bayer process in the precipitation and dewatering of solid phase oxalate.

The polymers from which the substantially dry polymers are formed may be either a homopolymer, copolymer, or terpolymer. The chosen emulsion polymers preferably have a high molecular weight, typically greater than $3.0 \times 10^6$. The polymer emulsions contain a surfactant and an emulsifier which can aid in the drying process. The emulsion polymers are described in more detail as follows.

The copolymer emulsion can have a mole ratio of methyl acrylate to acrylic acid of from about 90:10 to about 99.5:0.5. The copolymer preferably has a mole ratio of methyl acrylate to acrylic acid of 97.5:2.5 to 99:1. The copolymers which are formed from acrylic acid and acrylic acid esters, include alkyl esters made from acrylic and methacrylic acid and alcohols having from 1 to about 10 carbons. The alkyl ester can have a straight or branched chain, and may contain aliphatic and/or aromatic groups. The ester can be a methyl ester.

Polymer emulsions formed from acrylic acid and acrylic acid ester monomers ranging in composition from essentially 99% mer units of the acrylic acid ester monomer down to less than 50% mer units of acrylic acid ester monomer are used. Preferably, the molecular weights range from about 4 million to 10 million. The high molecular weight of the polymers produces upon hydrolysis a reduced specific viscosity (RSV) in the range of from 30 up to 60 dl/g.

The surfactant added to the emulsion may be selected from the group consisting of sodium dodecyl benzene sulfonate, $C_1$–$C_{10}$ linear and branched alkyl phenol ethoxylates, ethylene-oxide/propylene oxide block copolymers, sodium lauryl sulfate, ammonium sulfate salt of $C_1$–$C_{10}$ linear or branched alkyl phenol ethoxylates, sodium sulfate salt of $C_1$–$C_{10}$ linear or branched alkylphenol and combinations thereof. The surfactant may also be a combination of ammonium nonylphenol ethoxylate sulfate, octylphenol ethoxylate and ethylene oxide/propylene oxide block copolymer. Surfactants are typically in a ratio of from 55:15:30 to 85:6:9 of ammonium sulfate salt of nonylphenol ethoxylate, octylphenol ethoxylate and ethylene oxide/propylene oxide block copolymer. Preferably, the surfactants are in a relative ratio to one another of 79:9:12 of ammonium sulfate salt of nonylphenol ethoxylate, octylphenol ethoxylate and thylene oxide/propylene oxide block copolymer.

The initiators may be selected from the group consisting of redox pairs of transition metal ions/peroxides and inorganic reductants/oxidants. Preferably, the initiators may be potassium chlorate and ferrous sulfate heptahydrate. The monomers may be selected from the group consisting of (meth)acrylic acid, vinyl acetate, methyl acrylate, methyl methacrylate, nonyl-2-benzyl ester of acrylic acid, t-butyl acrylate, t-butyl methacrylate and combinations thereof.

The polymer emulsions are water continuous where the polymers are dispersed in water (true emulsions), with the water as the continuous phase, whereas conventional latex polymers are dispersed in an oil phase with an inversion step being required before the polymers can be used as flocculants.

Polymers can be synthesized from other acrylic esters, conjugated diolefins, monovinyl substituted aromatic compounds, methyl acrylate, methyl methacrylate, vinyl acetate, t-butyl acrylate, t-butyl methacrylate and other poorly water soluble vinylic compounds which would constitute the major component of the polymers. Any water soluble vinylic monomer can be copolymerized with the above monomers, so long as the level of the latter is significantly low, <10 M %. Additionally, hydrophilic monomers such as sodium styrene sulfonate and sodium vinyl sulfonate can be readily copolymerized with the above hydrophobic monomers.

Most any emulsifier known in the art may be used in creating the dried polymer emulsions. Example emulsifiers include: anionic, cationic and nonionic varieties of emulsifiers. Preferably, the emulsifiers are used as a combination of anionic and nonionic emulsifiers. Linear and branched alcohol sulfates, sodium (branched and linear) docecyl benzene sulfonate, sodium alpha olefin sulfonates, sulfated alkylphenol ethoxylates, sulfated linear and branched alcohol ethoxylates, quaternary ammonium salts, fatty acid salts and ethoxylates of aliphatic and aromatic phosphate esters are among the preferred anionic surfactants. Preferred nonionic emulsifiers are linear and branched alcohol ethoxylates, alkylphenol ethoxylates, ethylene oxide-propylene oxide (EP-PO) block copolymers and EO-PO block copolymers modified with ethylenediamine. Preferred cationic emulsifiers are fatty amine ethoxylates, fatty amine oxides, quaternary ammonium salts oxazoline and imidazoline based emulsifiers.

Various permutations of the emulsifiers at 2–15% based on the monomer can be utilized to obtain a shear stable system wherein little or no gel is obtained. Other requirements for the emulsifier combination include minimum foaming during the deoxygenation with $N_2$ purge, extended shelf stability and easy dispersion into water. Foaming problems can be avoided by the utilization of a silicone based antifoam at 0. 1–1.0% based on the product. Emulsion stability can be enhanced by the addition of polymeric stabilizers such as methyl cellulose, poly(vinyl alcohol), poly(vinyl pyrrolidone) and poly(ethylene glycol) which can be used in conjunction with the above emulsifiers.

In the above polymerization, the monomer concentration ranged from 20–50%, more often at 30–40%. To overcome the gel problem, polymerization was conducted as a semi-batch process by adding the monomer(s) in 2–4 batches to the heel containing the emulsifier solution in the reactor. To maximize the $M_w$, the redox initiators were used at ppm levels (1–15 ppm) and were fed continuously at a reaction temperature of 5–15° C. A cessation of the exotherm was indicative of the monomer consumption. Thereafter, the reaction temperature was raised to 25–35° C. and additional initiators were fed to reduce the residual monomer level to less than 1%.

To control the molecular weight and to minimize long chain branching and improve the polymer linearity, chain transfer agents such as alkyl mercaptans, glycollic acid, thioglycollic acid, isopropanol and formic acid were used in the monomer phase, at 10 ppm to 10% based on the monomer.

Redox initiators were used to achieve a high $M_w$ through low temperature polymerization. Redox initiator pairs include lower valency transition metal ions such as $Fe^{+2}$, $Cr^{+2}$, $V^{+2}$, $Ti^{+3}$, $Co^{+2}$, $Cu^{+1}$ and hydrogen peroxide or another hydroperoxide such as t-butyl or cumene hydroperoxide. Additional applicable initiator types include 2-mercaptoethanol, thioglycollic acid or thiourea oxidized by $Fe^{+3}$, $Ce^{+4}$, bromate or persulfate ions. Moreover, combinations of inorganic reductants and oxidants such as persulfate/thiosulfate, chlorate/ferrous salt and persulfate/ferrous salt can produce radicals to initiate the polymerization.

The following examples are provided to better illustrate the emulsion polymers of the invention and are not meant to limit the invention unless otherwise stated in the appended claims.

Dried Polymer

A substantially dry polymer according to an embodiment described in the present application was prepared on a pilot scale Tamato-Ohkawara DL-41 Spray Drier at air temperatures between 100–200° C. and an air flow rate of 0.45–0.7 $m^3$/min. The aspiration rate was held constant at 1.4 kg/$cm^2$. Using the synthesized polymer having a 99/1 mole percent water-continuous formula produced better powder solids than that produced by the 94/6 mole percent formula. This difference is thought to be due to the differing surfactant packages for the two formulas or to a smaller fraction of AA in the polymers. Additionally, it was discovered that as the drying residence times increased for a sample, the drier the powder formed.

In Table I, the data resulting from testing two water-continuous emulsion polymers having different mole fractions is given. In the first column, the two polymers are listed in both the dry form and the emulsion form. Column two shows the percent polymer actives expressed as acrylic acid for each tested polymer. Column three lists the moisture data. Columns four and five list the reduced specific viscosity for each tested polymer after a specific hydrolysis period. The specific viscosity of the hydrolyzed polymers was measured in 2N NaNO₃ at 30° C. In column six, the replacement ratio vs. 100 mole % poly-amonium acrylate benchmark flocculant is listed. The replacement ratio is how much of one polymer is needed to achieve the same results of another polymer. The results indicate that the dry polymers gave essentially identical performance as the emulsion polymer from which they are derived.

TABLE I

| p.MA/AA | p.AA Actives, % | Moisture % | RSV, dL/g (20 min) | RSV, dL/g (45 min) | RR$_{(actives)}$ vs. 100 mole % p.NH₄AA |
|---|---|---|---|---|---|
| 94/6 mole % emulsion | 15.7 | — | 41.0 | 34.0 | 0.7 |
| 94/6 mole % Dry powder | 76.0 | 0.3–1.0 | 38.1 | | 0.7 |
| 99/1 mole % emulsion | 15.3 | — | 47.2 | 41.0 | 0.6 |
| 99/1 mole % Dry powder | 63.5 | 0.5–1.5 | 42.2 | 38.6 | 0.6 |

A substantially dry polymer was prepared according to an alternative embodiment described in the present application by evaporating the moisture from the emulsion to form a film that is latter ground to a powder consisting of the substantially dry water insoluble polymers.

In Table II, the data resulting from an experiment of two samples of ground air-dried polymers is represented. In the experiment approximately 60 grams of a Water-Continuous 98DF063 emulsion was allowed to air dry overnight in a 6" petri-dish to form a plastic film. For air-dried sample 1, the formed film was cut up with a pair of scissors and the pieces were dissolved in a caustic solution. For sample 2, the formed film was cut into large approximately 1" square pieces and then ground through a Brinkman (Retsch) rotating screen grinder. The powder was then dissolved in a caustic solution.

As noted from the experiment, there was some loss in polymer RSV upon grinding, the unground air-dried sample 1 having an RSV of 36 dL/g and the ground air-dried sample 2 having an RSV of 29 dL/g. Both dry polymers have p.MA/AA chemistries which are converted to predominately poly acrylate p.NaAA/MA after hydrolysis in the caustic solution. Both samples gave similar settling performance, with the dosage response curve for sample 2 having a curve that is not as steep as that for sample 1 consistent with sample 2 having a lower RSV.

TABLE II

| Flocculant | Product Dosage g product/ ton mud | Dosage Polymer solids, ppm | Mud Settling Rate ft/hr | Overflow Clarity 10 min.NTU |
|---|---|---|---|---|
| Air-Dried Sample 1 | 85 | 3.6 | 3 | 315 |
| Air-Dried Sample 1 | 128 | 5.3 | 21 | 392 |
| Air-Dried Sample 1 | 156 | 6.5 | 49 | 420 |
| Air-Dried/Ground Sample 2 | 88 | 3.6 | 2 | 219 |
| Air-Dried/Ground Sample 2 | 110 | 4.5 | 11 | 345 |
| Air-Dried/Ground Sample 2 | 132 | 5.3 | 19 | 343 |
| Air-Dried/Ground Sample 2 | 165 | 6.7 | 25 | 382 |
| 98DF063 | 293 | 3.8 | 9 | 214 |
| 98DF063 | 379 | 5.1 | 24 | 380 |
| 98DF063 | 450 | 6.1 | 33 | 391 |

Laboratory Prepared Slurry with 42.2 g/L Red Mud Solids
(actual plant spent liquor and Jamaican Bauxite)

Homopolymer

An oil in water emulsion of poly(methyl acrylate) homopolymer was synthesized in the following manner. In a 1 liter polymerization flask fitted with baffles, 561.49 g of deionized water, 54.3 g of nonylphenol ethoxylate sulfate ammonium salt (58% solution), available from Rhone-Poulenc of Cranbury, N.J., 4.9 g of octylphenol ethoxylate (70%), available from Rhone-Poulenc of Cranbury, N.J., 4.8 g of EO-PO block copolymer available from BASF, Mt. Olive, N.J., 0.1 g EDTA tetra sodium salt and sulfuric acid (0.02 g) were taken and a solution was effected by mixing. To the clear solution, 5.0 g of Sag 2001, an antifoam agent available from Witco of Greenwich, Conn. was added, and nitrogen was then sparged through the solution for 15 minutes, after which the solution was cooled to 10° C.

The monomer, methyl acrylate (99%—353.54 g), and formic acid (0.175 g) were mixed in an addition funnel. A third of the monomer was added to the emulsifier solution in the reactor and nitrogen sparge was continued for additional 10 minutes. Ferrous heptahydrate (0.002 g) was dissolved in sulfuric acid (0.07 g) solution in water (6.9 g) and the potassium chlorate (0.0019 g) was dissolved in water (6.9 g). The initiator solutions were drawn into separate syringes and fitted into metered syringe pumps. The initiators were pumped in at a slow rate to maintain a constant reaction temperature (10–13° C.). When an exotherm was no longer perceptible, the initiator addition was stopped and another third of the monomer was added to the reactor. Polymerization was repeated as described above. Finally, the third lot of the monomer was added to complete the polymerization.

After completing the polymerization, the reaction temperature was raised to 25° C. to reduce the unreacted monomer to a level bellow 2%. The polymer was collected to determine the gel No. (100 mesh screen) and hydrolyzed for 1 hr at 85° C. in caustic at 1% emulsion concentration to determine the residual monomer by liquid chromatography (for acrylic acid) and the reduced specific viscosity, intrinsic viscosity, and molecular weight. The hydrolyzed MA homopolymer has an RSV of 28.3 dL/g and the polymer has a molecular weight of between $4.4 \times 10^6$ and $5.2 \times 10^6$.

Copolymer

The following is an example of the preparation of a high molecular weight copolymer. The copolymer formed is poly(methyl acrylate/acrylic acid) having a 94/6 mole ratio.

In a 1 liter polymerization flask fined with baffles was added deionized water (552.9 g), nonylphenol ethoxylate sulfate ammonium salt (19.84 g of 58% solution), available from Rhone-Poulenc of Cranbury, N.J., sodium dodecyl benzene sulfonate (17.44 g of 23% solution) available from the same, and EO-PO block copolymer (3.88 g) available from BASF, Mt. Olive, N.J. and EDTA tetra sodium salt (0.96 g) were taken and a solution was effected by mixing. To the resultant clear solution was added SAG 2001 (0.19 g), an antifoaming agent available from Witco of Greenwich, Conn. and then nitrogen was sparged through the solution for 15 minutes with the solution being cooled down to 10° C.

Methyl acrylate (99%) 367.2 g, AA 19.19 g, and formic acid (0.15 g) were mixed in an addition funnel. A third of this mixture was added to the emulsifier solution in the reactor and the nitrogen sparge was continued for additional 10 minutes. Ferrous sulfate heptahydrate (0.002 g) was dissolved with sulfuric acid (0.07 g) and water (9.65 g) and then the potassium chloride (0.0019 g) was dissolved in water (6.9 g). The initiator solutions were drawn into separate syringes and fined into metered syringe pumps.

The initiators were pumped in at a slow rate to maintain a constant reaction temperature of 10–13° C. When an exotherm was no longer perceptible, the initiator addition was stopped and another third of the monomer was added to the reactor. Polymerization was repeated as described above. Finally, the third lot of the monomer was added completing the polymerization. After polymerization the reaction temperature was raised to 25° C. and held for approximately an hour to reduce the unreacted monomer level to below 2 percent.

Terpolymer

The following illustrates the preparation of a terpolymer. A 19:6:75 mole ratio poly(vinyl acetate/acrylic acid/methylacrylate) was synthesized in the following manner. In a 1 liter polymerization flask fitted with baffles, 295.0 g of deionized water, 10.34 of nonylphenol ethoxylate sulfate ammonium salt (58% solution), available from Rhone-Poulenc of Cranbury, N.J., 9.02 g of sodium dodecyl benzene sulfonate (23% solution) available from the same, and 2.0 g of EO-PO block copolymer available from BASF, Mt. Olive, N.J. were taken and a solution was effected by mixing. To the resultant clear solution 0.19 g of SAG 2001, an antifoam agent available from Witco of Greenwich, Conn. and vinyl acetate (99%) 40.8 g were added, nitrogen was sparged through the solution for 15 minutes and the solution was cooled down to 10° C.

Methyl acrylate 99% (151.1 g—AA 10.0 g) and glycolic acid (0.2 g) were mixed in an addition funnel. A third of this mixture was added to the emulsifier solution in the reactor and the nitrogen sparge was continued for additional 10 minutes.

Ferrous sulfate heptahydrate (0.0035 g) was dissolved with sulfuric acid (0.1 g) solution in water (9.65 g) and the potassium chloride (0.0032 g) were dissolved in water (0.68 g). The initiator solutions were drawn into separate syringes and fitted into metered syringe pumps.

The initiators were pumped in at a slow rate to maintain a constant reaction temperature of 10–13° C. When an exotherm was no longer perceptible, the initiator addition was stopped and another third of the monomer was added to the reactor. Polymerization was repeated as described above. Finally, the third lot of the monomer was added and polymerization was completed. After polymerization the reaction temperature was raised to 25° C. and held for approximately an hour to reduce the unreacted monomer level to below 2 percent.

Changes can be made in the composition, operation and arrangement of the method of the present invention described within, without departing from the concept and scope of the invention as defined in the following claims.

What is claimed is:

1. A method of treating Bayer process red mud containing liquor comprising the steps of:
    adding to the red mud-containing liquor a substantially dry water insoluble high molecular weight polymer formed from a polymer emulsion of poly alkyl esters of vinylic monomers having an intrinsic viscosity in 2N $NaNO_3$ at 30° C. of at least 18 dL/g;
    forming a red mud phase and a clarified liquor phase; and
    recovering the clarified liquor phase.

2. The method of claim 1, wherein the polymer emulsion is a poly(methyl acrylate/acrylic acid) emulsion copolymer, wherein the copolymer is formed from monomers having a mole ratio of methyl acrylate to acrylic acid of from about 85:15 to about 99.9:0.1.

3. The method of claim 2, wherein the copolymer is from about 60 to about 90 percent hydrolyzed in the liquor.

4. The method of claim 1, wherein a portion of the polymer added to the red mud-containing liquor is pre-hydrolyzed.

5. The method of claim 4, wherein the pre-hydrolyzed polymer is hydrolyzed from about 60 to about 90 percent.

6. The method of claim 5, wherein the pre-hydrolyzed polymer is added to the feed line and/or center well of a mud thickening vessel.

7. The method claim 5, wherein the pre-hydrolyzed polymer is hydrolyzed using a caustic liquor selected from the group consisting of spent liquor, washer overflow liquor and return liquor from mud lakes.

8. The method of claim 1, wherein the total alkalinity of the red mud containing liquor is from about 10 to about 300 grams per liter expressed as sodium carbonate.

9. The method of claim 1, wherein the treatment of the red mud containing liquor is conducted at atmospheric pressure and at a temperature of from about 5° C. to about 200° C.

10. A method for treating Bayer process red mud containing liquor comprising the steps of:
    adding to the red-mud containing liquor an effective amount of a substantially dry water insoluble high molecular weight polymer formed from a homopolymer emulsion wherein the homopolymer has an intrinsic viscosity in 2N $NaNO_3$ at 30° C. of at least 15 dL/g;
    forming a red mud phase and a clarified liquor phase; and
    recovering the clarified liquor phase.

11. The method of claim 10, wherein the homopolymer is from about 60 to about 90 percent hydrolyzed in the red mud-containing liquor.

12. The method of claim 10, wherein at least a portion of the polymer added to the red mud-containing liquor is pre-hydrolyzed.

13. The method of claim 12, wherein the pre-hydrolyzed polymer is added to the feed line and/or center well of a mud thickening vessel.

14. The method claim 12, wherein the pre-hydrolyzed polymer is hydrolyzed using a caustic liquor selected from the group consisting of spent liquor, washer overflow liquor and return liquor from mud lakes.

15. The method of claim 10, wherein the treatment of the red mud containing liquor is conducted at atmospheric pressure and at a temperature of from about 5° C. to about 250° C.

16. A method for treating Bayer process red mud containing liquor comprising the steps of:

adding to the red-mud containing liquor an effective clarifying amount of a substantially dry water insoluble high molecular weight polymer formed from a terpolymer emulsion wherein the terpolymer has an intrinsic viscosity in 2N NaNO$_3$ at 30° C. of at least 15 dL.g;

forming a red mud phase and a clarified liquor phase; and recovering the clarified liquor phase.

17. The method of claim 16, wherein the terpolymer is formed from free radical polymerization of monomers selected from the group consisting of methyl acrylate, methyl methacrylate, t-butyl acrylate, t-butyl methacrylate, acrylic acid and vinyl acetate.

18. The process of claim 16, wherein the terpolymer is represented by the formula of p.MA/AA/X, wherein MA is selected from the group consisting of methyl acrylate and methyl methacrylate, AA is acrylic acid and X is selected from the group consisting of t-butyl acrylate, t-butyl methacrylate and vinyl acetate.

19. The process of claim 18, wherein the terpolymer has a mole ratio of 1–20% t-butyl acrylate or t-butyl methacrylate, 0.5–10% acrylic acid and 70%–98.5% methyl acrylate or methyl methacrylate.

20. The process of claim 18, wherein the terpolymer has a mole ratio of 1–20% vinyl acetate, 0.5–10% acrylic acid and 70%–98.5% methyl acrylate.

21. The method of claim 16, wherein at least a portion of the polymer added to the red mud-containing liquor is pre-hydrolyzed.

22. The method of claim 21, wherein the pre-hydrolyzed polymer is added to the feed line and the center well of a mud thickening vessel.

23. The method claim 21, wherein the pre-hydrolyzed polymer is hydrolyzed using a caustic liquor selected from the group consisting of spent liquor, washer overflow liquor and return liquor from mud lakes.

* * * * *